(12) United States Patent
Mushiga

(10) Patent No.: US 8,247,111 B2
(45) Date of Patent: Aug. 21, 2012

(54) ALKALINE BATTERY AND SEALING UNIT FOR ALKALINE BATTERY

(75) Inventor: Takashi Mushiga, Osaka (JP)

(73) Assignee: Panasonic Corporation, Osaka (JP)

( * ) Notice: Subject to any disclaimer, the term of this patent is extended or adjusted under 35 U.S.C. 154(b) by 851 days.

(21) Appl. No.: 12/331,751

(22) Filed: Dec. 10, 2008

(65) Prior Publication Data

US 2009/0258292 A1  Oct. 15, 2009

(30) Foreign Application Priority Data

Apr. 15, 2008  (JP) .................................. 2008-105776

(51) Int. Cl.
  *H01M 2/08* (2006.01)
(52) U.S. Cl. ....................................................... 429/185
(58) Field of Classification Search ..................... 429/185
  See application file for complete search history.

(56) References Cited

U.S. PATENT DOCUMENTS 6,013,389 A * 1/2000 Nakamaru et al. ............ 429/161

FOREIGN PATENT DOCUMENTS

| JP | 09-007572 |   | 1/1997 |
|----|-----------|---|--------|
| JP | 09-007572 A | * | 1/1997 |
| JP | 2005-216737 |   | 8/2005 |

* cited by examiner

*Primary Examiner* — Joseph Kosack
(74) *Attorney, Agent, or Firm* — McDermott Will & Emery LLP

(57) ABSTRACT

An opening part of a battery casing is sealed by a sealing unit into which a negative electrode terminal plate, a negative electrode current collector joined to the negative electrode terminal plate, and a gasket are integrated. The gasket includes a boss part through which the negative electrode current collector passes, an outer peripheral part in contact with the opening part of the battery casing, and an annular part arranged between the boss part and the outer peripheral part, and a part of the annular part is formed into a thin part serving as a safety valve. The negative electrode current collector has a body diameter of 1.8 mm or smaller and includes at the end part thereof a collar part. The ratio of the outer diameter of the boss part to the outer diameter of the collar part is 4.0 or smaller.

11 Claims, 6 Drawing Sheets

FIG. 3

| | Negative electrode current collector | | | | Gasket (boss part) | | | | Sealing unit | | | Alkaline battery |
|---|---|---|---|---|---|---|---|---|---|---|---|---|
| | Body diameter (D) | Collar diameter ($L_1$) | Collar length ($L_2$) | Collar thickness | Outer diameter ($2R_1$) | Inner diameter ($2R_2$) | Length (H) | Outer diameter ratio of boss part to collar part ($2R_1/L_1$) | Fitting area ($\pi D \cdot H$) | Fitting rate ($D/R_2$) | Result of short-circuit test (burst set count/ test set count) |
| | mm | mm | mm | mm | mm | mm | mm | | mm² | | |
| Example 1 | 1.80 | 3.40 | 0.80 | 0.40 | 13.6 | 3.44 | 7.00 | 4.0 | 39.6 | 1.05 | 0/5 |
| Example 2 | 1.80 | 3.40 | 0.80 | 0.40 | 10.4 | 3.44 | 7.00 | 3.1 | 39.6 | 1.05 | 0/5 |
| Example 3 | 1.80 | 4.20 | 1.20 | 0.40 | 16.8 | 3.44 | 7.00 | 4.0 | 39.6 | 1.05 | 0/5 |
| Example 4 | 1.80 | 4.20 | 1.20 | 0.40 | 13.0 | 3.44 | 7.00 | 3.1 | 39.6 | 1.05 | 0/5 |
| Comparative Example 1 | 1.80 | 3.40 | 0.80 | 0.40 | 18.0 | 3.44 | 7.00 | 5.3 | 39.6 | 1.05 | 3/5 |
| Example 5 | 1.45 | 3.05 | 0.80 | 0.40 | 12.2 | 2.76 | 7.00 | 4.0 | 31.9 | 1.05 | 0/5 |
| Example 6 | 1.45 | 3.05 | 0.80 | 0.40 | 9.4 | 2.76 | 7.00 | 3.1 | 31.9 | 1.05 | 0/5 |
| Example 7 | 1.45 | 3.85 | 1.20 | 0.40 | 15.4 | 2.76 | 7.00 | 4.0 | 31.9 | 1.05 | 0/5 |
| Example 8 | 1.45 | 3.85 | 1.20 | 0.40 | 11.8 | 2.76 | 7.00 | 3.1 | 31.9 | 1.05 | 0/5 |
| Comparative Example 2 | 1.45 | 3.05 | 0.80 | 0.40 | 18.0 | 2.76 | 7.00 | 5.9 | 31.9 | 1.05 | 4/5 |
| Example 9 | 1.10 | 2.70 | 0.80 | 0.40 | 10.8 | 2.28 | 7.00 | 4.0 | 24.2 | 0.96 | 0/5 |
| Example 10 | 1.10 | 2.70 | 0.80 | 0.40 | 8.3 | 2.28 | 7.00 | 3.1 | 24.2 | 0.96 | 0/5 |
| Example 11 | 1.10 | 3.50 | 1.20 | 0.40 | 14.0 | 2.28 | 7.00 | 4.0 | 24.2 | 0.96 | 0/5 |
| Example 12 | 1.10 | 3.50 | 1.20 | 0.40 | 10.8 | 2.28 | 7.00 | 3.1 | 24.2 | 0.96 | 0/5 |
| Comparative Example 3 | 1.10 | 2.70 | 0.80 | 0.40 | 15.0 | 2.28 | 7.00 | 5.6 | 24.2 | 0.96 | 4/5 |

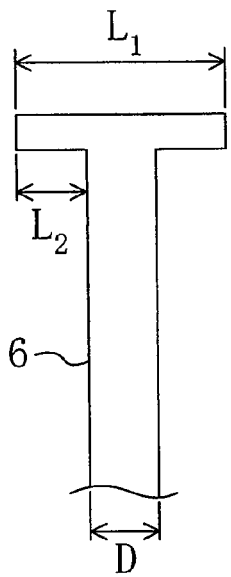
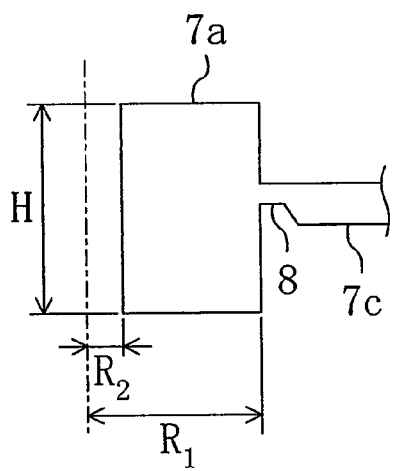
FIG. 4A        FIG. 4B
FIG. 5
| Negative electrode current collector | Gasket | Sealing unit | Inner volume of battery | Discharge performance | Number of batteries in which leakage by creeping is caused between current collector and basket |
|---|---|---|---|---|---|
| Body diameter (mm) | Length of boss part (mm) | Fitting area (mm²) | | | |
| 1.6 | 7 | 35.2 | 100 | 100 | 0 /50 |
| 1.6 | 5.5 | 27.6 | 105 | 102 | 15 /50 |
| 1.6 | 7.6 | 38.2 | 97 | 97 | 0 /50 |

FIG. 7
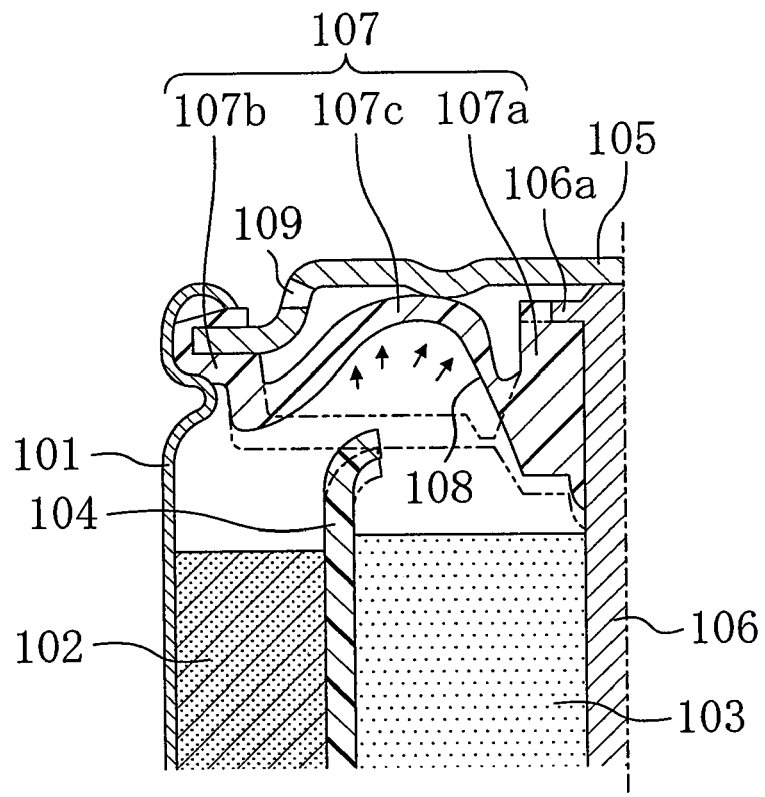
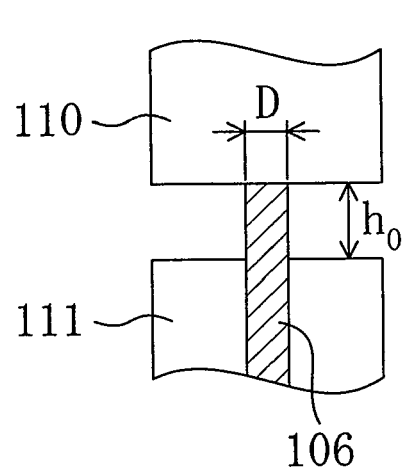
FIG. 8A
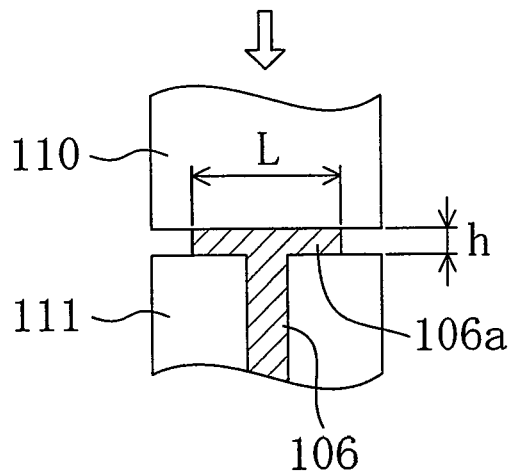
FIG. 8B

ALKALINE BATTERY AND SEALING UNIT FOR ALKALINE BATTERY

BACKGROUND OF THE INVENTION

The present disclosure relates to an alkaline battery including a safety valve that operates upon abnormal rise in the internal pressure of the battery and particularly relates to a structure of a sealing unit for sealing an opening part of a battery casing.

Referring to a general cylindrical alkaline battery, a positive electrode mixture 102, a gelled negative electrode 103, and a separator 104 are put in a bottomed cylindrical battery casing 101 together with alkaline electrolyte, and the opening part of the battery casing 101 is sealed by a sealing unit as an integration of a negative electrode terminal plate 105, a negative electrode current collector 106, and a gasket 107, as shown in FIG. 6A.

The gasket 107 includes a boss part 107a through which the negative electrode current collector 106 passes, an outer peripheral part 107b in contact with the opening part of the battery casing 101, and an annular part 107c arranged between the boss part 107a and the outer peripheral part 107b, and thin part 108 serving as a safety valve is formed at a part of the annular part 107c. Upon abnormal rise in the internal pressure of the battery, the thin part 108 is broken to release gas generated in the battery outside the battery through a gas hole 109 formed in the negative electrode terminal plate 105, thereby preventing the battery from being burst.

In the case where short-circuit occurs in a state, for example, where a plurality of batteries are connected to each other in series, the short-circuit current causes abrupt temperature rise of a battery itself to soften the gasket 107, which is made of resin, by the high temperature heat and to deform it by the pressure of gas generated inside the battery. In this state, if the annular part 107c of the gasket 107 is bent and extended fully to be in contact with the negative electrode terminal plate 105, as shown in FIG. 6B, the thin part 108 cannot be broken to invite ineffective operation of the safety valve.

To tackle this problem, Japanese Unexamined Patent Application Publication 9-7572 proposes a technique for securely braking the thin part 108 even if the annular part 107c is extended fully due to temperature rise in the battery by providing a blade-shaped protrusion opposite the thin part 108 around the negative electrode current collector 106.

Although this technique exhibits an effect of effectively operating the safety valve by securely breaking the thin part 108, the structure of the negative electrode current collector 106 becomes complicated to invite poor mass production and an increase in cost.

Another technique for readily breaking the thin part 108 even when the annular part 107c is extended fully is shown in FIG. 6C. Namely, the boss part 107a is made long to separate enough the annular part 107c from the negative electrode terminal plate 105 in advance so that the thin part 108 is securely broken even when the annular part 107c is extended fully. This realizes an alkaline battery including a safety valve that can effectively operate without inviting structure complication of the negative electrode current collector 106 and the gasket 107.

SUMMARY OF THE INVENTION

In order to reduce the cost of an alkaline battery, it is a key to reducing the costs of the elements and the material of the alkaline battery.

The sealing unit for sealing the opening part of the battery casing is an element into which the negative electrode terminal plate, the negative electrode current collector, and the gasket are integrated. Among of them, the negative electrode current collector is different from the negative electrode terminal plate and the gasket in that the body diameter thereof can be set independently of the outer diameter of the battery casing. Therefore, further reduction in the body diameter of the negative electrode current collector, if possible, is effective in cost reduction.

In view of the foregoing, the inventor examined the battery characteristics of D and C alkaline batteries, which can enjoy cost reduction much, including negative electrode current collectors having body diameters thinner than conventional ones to fined that some safety valves operated ineffectively with no breakage of the thin part caused even upon gas pressure rise inside the battery in a short-circuit test of batteries connected in series.

Detailed examination on the batteries in which the thin parts were not broken revealed that the a part of the boss part 107a of the basket 107 which is in contact with a collar part 106a of the negative electrode current collector 106 (a flat part formed at the end part of the negative electrode current collector 106) is buried in the collar part 106a, as shown in FIG. 7.

Consequently, the reason why the thin part 108 of the gasket 107 is not broken might be that: the collar part 106a is buried in the boss part 107a so that the distance between the negative electrode terminal plate 105 and the annular part 107c of the gasket 107 cannot be kept at the preset value, with a result that the annular part 107c is bent and extended fully to be in contact with the negative electrode terminal plate 105 before the thin part 108 is broken.

The reason why the collar part 106a of the negative electrode current collector 106 is buried in a part of the boss part 107a of the gasket 107 might be as follows.

The collar part 106a of the negative electrode current collector 106 is provided for the purpose of fixing the negative electrode current collector 106 and preventing the sputtered particles from splattering in the battery casing in welding the end part of the negative electrode current collector 106 to the negative electrode terminal plate 105. Accordingly, it is preferably to set the outer diameter of the collar part 106a large.

In general, the collar part 106a of the negative electrode current collector 106 is formed by punching the end part of the negative electrode current collector 106 fixed to a dice 111 by a punch 110 (upsetting), as shown in FIG. 8A and FIG. 8B, and therefore, reduction in the body diameter of the negative electrode current collector 106 necessarily reduces the diameter of the collar part 106a.

Suppose that the upsetting ratio (z) is $(h_0-h)/h_0$ where $h_0$ is a length of the negative electrode current collector 106 before upsetting and h is a thickness of the collar part 106a after upsetting, the outer diameter (L) of the collar part 106a after upsetting is $(1/1-z)^{1/2}D$ where D is a body diameter of the negative electrode current collector 106. When the upsetting ratio (z) is 75%, for example, the outer diameter (L) of the collar part 106a is about two times the body diameter (D) of the negative electrode current collector 106 at the most.

Gas pressure rise inside the battery leads to pressure application not only to the annular part 107c of the gasket 107 but also to the boss part 107a. If the contact area between the boss part 107a and the collar part 106a is small, large pressure is applied to the contact face therebetween upon gas pressure rise. As well, if the body diameter of the negative electrode current collector 106 is small, the resistance of the negative electrode current collector 106 increases to increase the heat generated at short-circuit, thereby inviting softening of the boss part 107a itself in addition to elongation of the annular part 107c of the gasket 107. In addition, if the body diameter of the negative electrode current collector 106 is small, the fitting area between the inner peripheral face of the boss part 107a through which the negative electrode current collector 106 passes and the outer peripheral face of the negative electrode current collector 106 reduces to reduce the frictional force between the negative electrode current collector 106 and the boss part 107a. Further, D and C alkaline batteries include a much amount of an active material to increase the heat generated at short-circuit, which means that the boss part 107a is more liable to be softened upon short-circuit. Accordingly, gas pressure rise inside the battery causes pressure application to the boss part 107a, thereby applying excessive pressure to the contact face between the boss part 107a and the collar part 106a to cause the softened boss part 107a to be pushed toward the negative electrode terminal plate 105 against the frictional force between the boss part 107a and the negative electrode current collector 106. As a result, a part of the boss part 107a (in contact with the collar part 106a) might be buried in the collar part 106a.

Even in the case where the boss part 107a is fixed to the negative electrode current collector 106 with it spaced from the collar part 106a of the negative electrode current collector 106 for securing the distance between the negative electrode terminal plate 105 and the annular part 107c, the same as above is applied. Namely, as described above, if the body diameter of the negative electrode current collector 106 is small, the frictional force between the negative electrode current collector 106 and the boss part 107a reduces, and therefore, pressure application to the boss part 107a upon gas pressure rise inside the battery causes the boss part 107a to move toward the negative electrode terminal plate 105 against the frictional force between the boss part 107a and the negative electrode current collector 106 and then to be in contact with the collar part 106a, thereby causing the collar part 106a to be buried in a part of the softened boss part 107a. Hence, the safety valve may operate ineffectively.

The present invention has been made in view of the foregoing and provides a low-cost and reliable alkaline battery that allows a safety valve to operate effectively by securely breaking a thin part of a gasket upon abnormal rise in the internal pressure of the battery even when a negative electrode current collector has a reduced body diameter.

An alkaline battery in accordance with the present invention is an alkaline battery including a battery casing and a sealing unit sealing an opening part of the battery casing, wherein the sealing unit includes a negative electrode terminal plate, a negative electrode current collector joined to the negative electrode terminal plate, and a gasket, the gasket includes a boss part through which the negative electrode current collector passes, an outer peripheral part in contact with the opening part of the battery casing, and an annular part arranged between the boss part and the outer peripheral part, a part of the annular part being formed into a thin part serving as a safety valve, the negative electrode current collector has a body diameter of 1.8 mm or smaller and includes at an end part thereof a collar part, and a ratio of an outer diameter of the boss part to an outer diameter of the collar part is 4.0 or smaller.

With the above arrangement, even when the body diameter of the negative electrode current collector is 1.8 mm or smaller, setting of the ratio of the outer diameter of the boss part to the outer diameter of the collar part to be 4.0 or smaller prevents excessive pressure application to the contact face between the boss part and the collar part even upon pressure application to the boss part by abnormal rise in the internal pressure of the battery. Accordingly, the collar part is prevented from being buried in the softened boss part. Hence, the distance between the negative electrode terminal plate and the annular part of the gasket can be secured to achieve secured breakage of the thin part, thereby leading to effective operation of the safety valve. As a result, a low-cost and reliable alkaline battery can be realized.

In a preferred embodiment, the gasket is fitted around the negative electrode current collector with the boss part being in contact with the collar part of the negative electrode current collector.

In another preferred embodiment, the collar part is formed by upsetting the end part of the negative electrode current collector.

Referring to another aspect of the present invention, a sealing unit of an alkaline battery for sealing an opening part of a battery casing includes: a negative electrode terminal plate; a negative electrode current collector joined to the negative electrode terminal plate; and a gasket, wherein the gasket includes a boss part through which the negative electrode current collector passes, an outer peripheral part in contact with the opening part of the battery casing, and an annular part arranged between the boss part and the outer peripheral part, a part of the annular part being formed into a thin part serving as a safety valve, the negative electrode current collector has a body diameter of 1.8 mm or smaller and includes at an end part thereof a collar part, and a ratio of an outer diameter of the boss part to an outer diameter of the collar part is 4.0 or smaller.

BRIEF DESCRIPTION OF THE DRAWINGS

FIG. 3 is a table listing results of a short-circuit test carried out on alkaline batteries in Example of the present invention.

FIG. 4A and FIG. 4B are illustrations indicating each dimension of a negative electrode current collector and a gasket, respectively, in the embodiment of the present invention.

FIG. 5 is a table listing results of a test for examining leakage occurrence in alkaline batteries in Example of the present invention.

FIG. 7 is a sectional view for explaining a problem in the improved conventional alkaline battery.

FIG. 8A and FIG. 8B are illustrations showing a method for forming a collar part of a conventional negative electrode current collector.

DETAILED DESCRIPTION OF THE INVENTION

An embodiment of the present invention will be described below with reference to the accompanying drawings. The present invention is not limited to the following embodiment.

The reason why the safety valve (the thin part) of the gasket operates ineffectively upon abnormal rise in the internal pressure of the battery in the case where the body diameter of the negative electrode current collector is small is that, as has been already described above, application of excessive pressure to the contact face between the boss part of the gasket and the collar part of the negative electrode current collector causes the collar part to be buried in a part of the softened boss part.

This might be a problem that becomes remarkable by series connection of D or C alkaline batteries in which heat generated at short-circuit increases in addition to by reduction in the outer diameter of the collar part inevitably accompanied by reduction in the body diameter of the negative electrode current collector.

Referring to the boss part of the gasket, there have been considered the fastening degree set to the extent that no leakage is caused and the thickness set to the extent that no crack is caused in the boss part when the negative electrode current collector is allowed to pass therethrough and to be fixed thereto, but the relationship between the outer diameter of the boss part and the outer diameter of the collar part has not been taken into consideration.

The inventor focused attention to the cause of ineffective operation of the safety valve when the negative electrode current collector has a small diameter to reach an idea that excessive pressure application to the contact face between the boss part and the collar part can be avoided when the ratio $(S_A/S_B)$ between the area $(S_A)$ of the bottom face of the boss part (a face opposite to the negative electrode terminal plate) to the contact area $(S_B)$ between the upper face of the boss part (a face facing the negative electrode terminal plate) and the collar part is set at a predetermined value or smaller.

Where the outer diameter of the boss part is $R_A$ and the outer diameter of the collar part is $R_B$, the relationship $S_A/S_B \approx R_A^2/R_B^2 > R_A/R_B$ is held. Accordingly, the ratio $(R_A/R_B)$ of the outer diameter of the boss part to the outer diameter of the collar part can be used as an index value of a condition for preventing excessive pressure application to the contact face between the boss part and the collar part when the small body diameter of the negative electrode current collector is taken into consideration.

Figure 1:
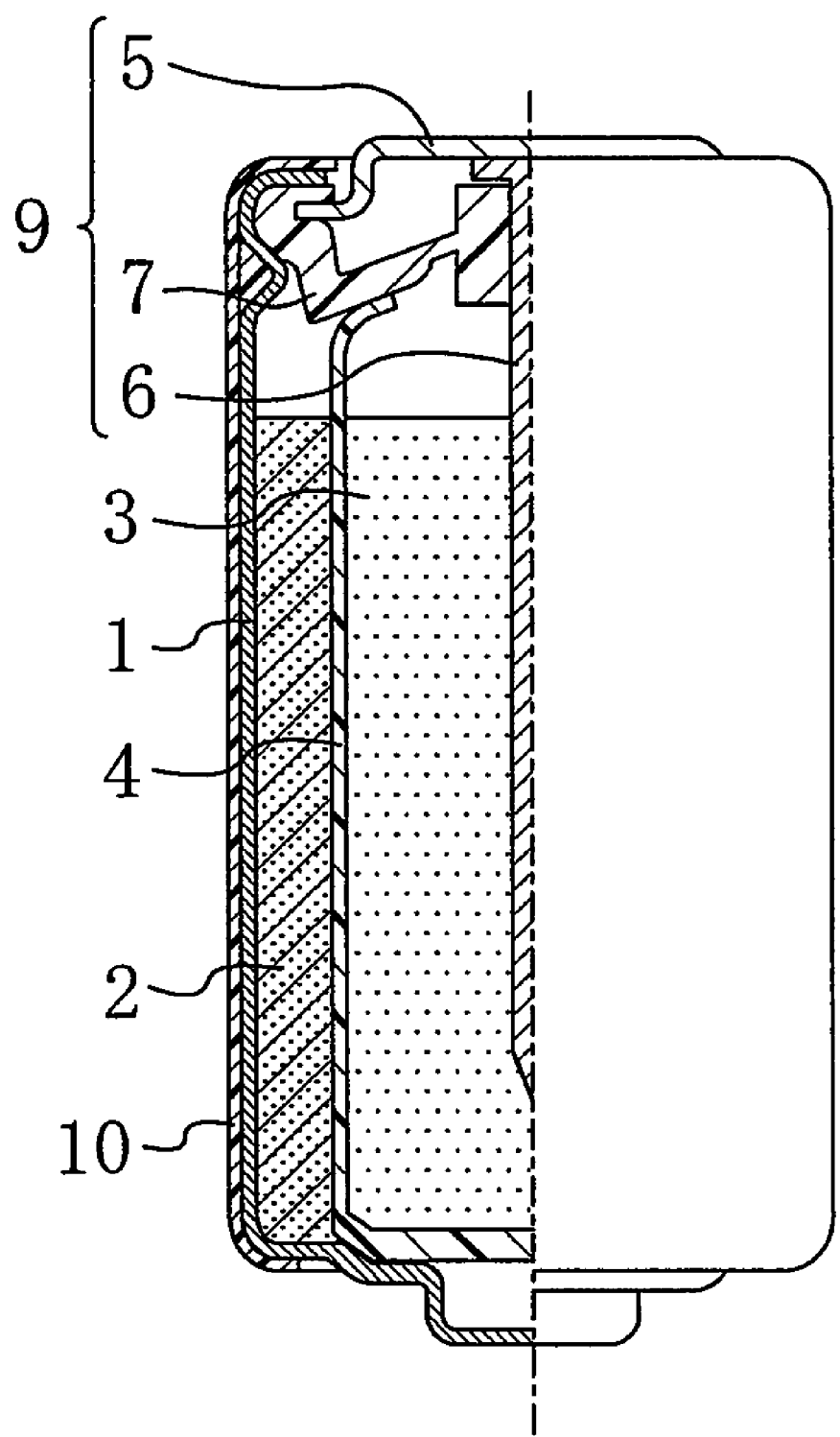
FIG. 1 is a semi-sectional view showing a construction of an alkaline battery in accordance with one embodiment of the present invention.

FIG. 1 is a semi-sectional view showing a construction of an alkaline battery in one embodiment of the present invention. In a bottomed cylindrical battery casing 1, a positive electrode 2 and a gelled negative electrode 3 are accommodated with a separator 4 interposed. The opening part of the battery casing 1 is sealed by a sealing unit 9 as an integration of a negative electrode terminal plate 5, a negative electrode current collector 6, and a gasket 7. The outer peripheral face of the battery casing 1 is covered with an outer label 10.

Figure 2:
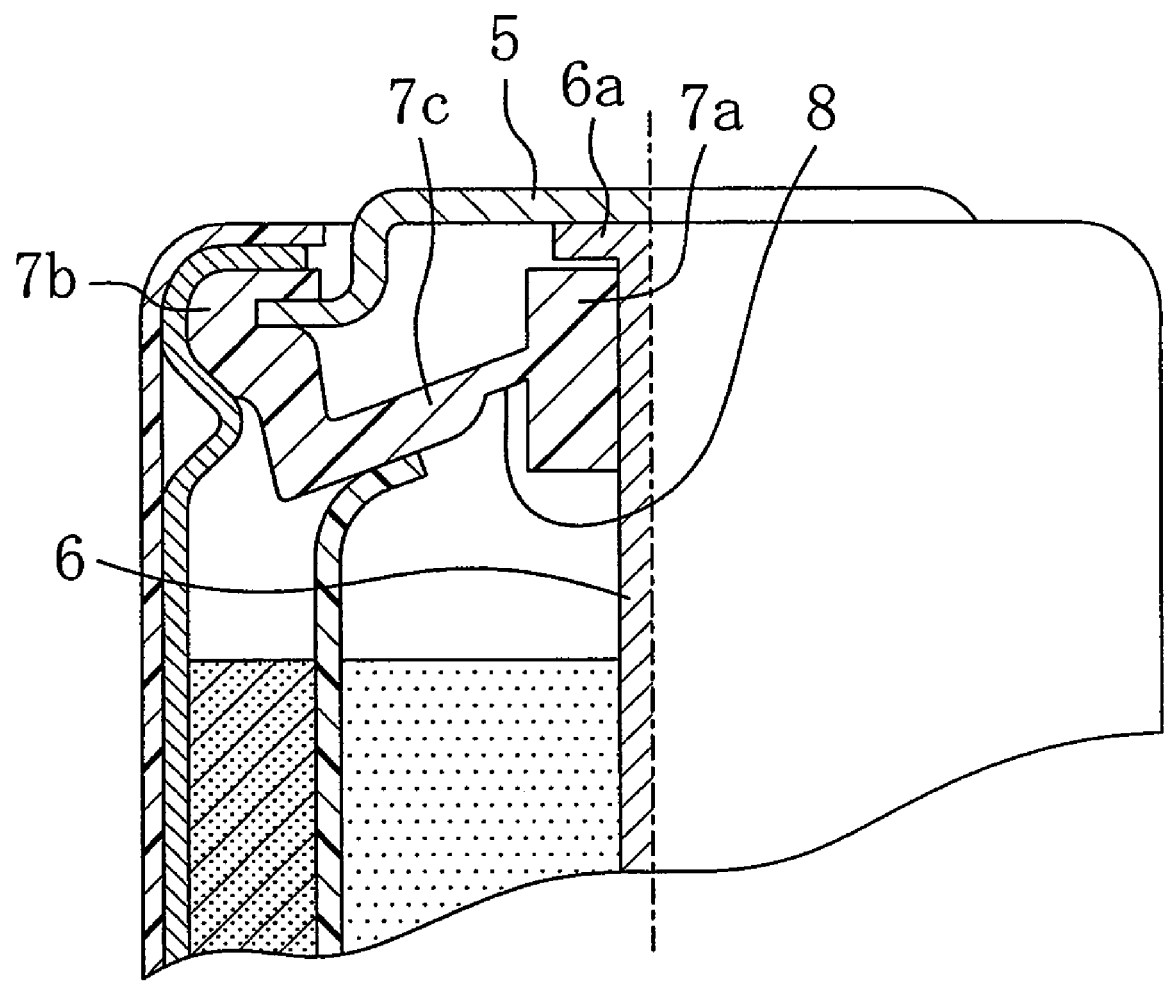
FIG. 2 is a sectional view showing a structure of a sealing unit of the alkaline battery in accordance with the embodiment of the present invention.
Figure 6A:
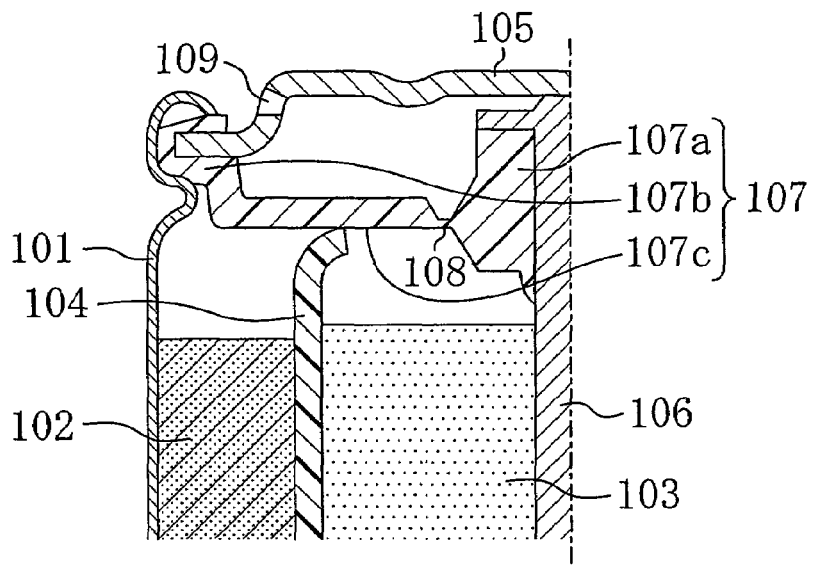
FIG. 6A is a sectional view showing a construction of a conventional alkaline battery.
Figure 6B:
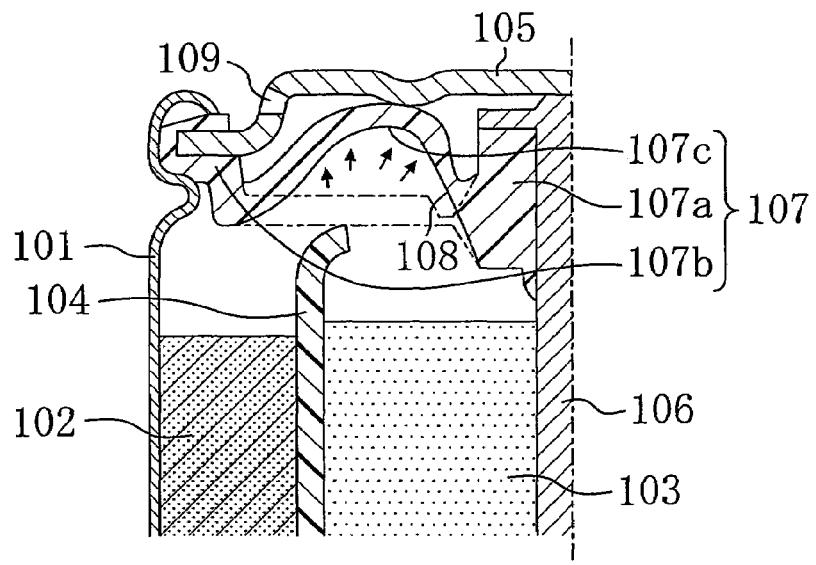
FIG. 6B is a sectional view for explaining a problem in the conventional alkaline battery.
Figure 6C:
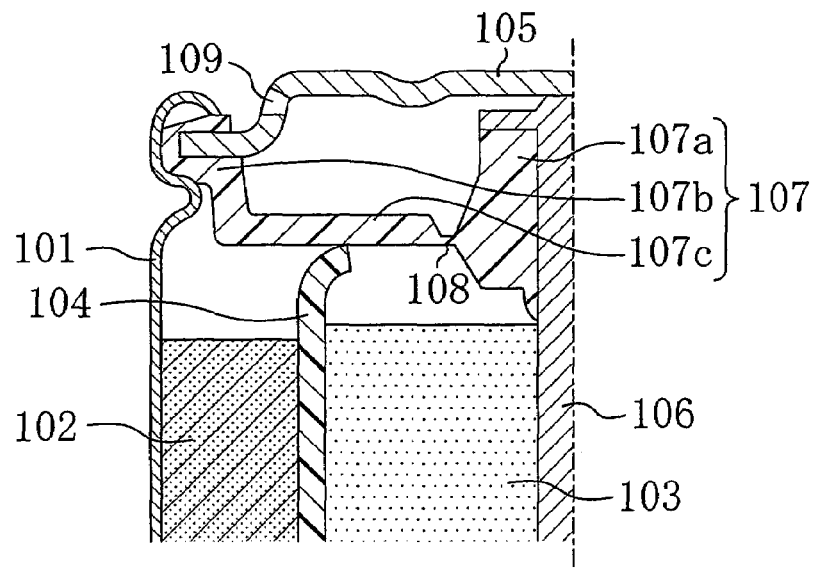
FIG. 6C is a sectional view showing a construction of an improved conventional alkaline battery.

FIG. 2 is a sectional view showing a structure of the sealing unit 9 of the alkaline battery in the embodiment of the present invention. The gasket 7 includes a boss part 7a through which the negative electrode current collector 6 passes, an outer peripheral part 7b in contact with the opening part of the battery casing 1, and an annular part 7c arranged between the boss part 7a and the outer peripheral part 7b, and a thin part 8 serving as a safety valve is formed at a part of the annular part 7c. At the end part of the negative electrode current collector 6, a collar part 6c is formed which is welded to the negative electrode terminal plate 5.

The negative electrode current collector 6 employed in the embodiment of the present invention has a body diameter of 1.8 mm or smaller. In the case where the collar part 6a of the negative electrode current collector 6 is formed by upsetting the end part of the negative electrode current collector 6, it is necessary to set the ratio of the outer diameter of the boss part 7a to the outer diameter of the collar part 6a to be 4.0 or smaller for allowing the safety valve to operate effectively by securely breaking the thin part 8 upon abnormal rise in the internal pressure of the battery.

Further, for suppressing lowering of the current collecting effect, the body diameter of the negative electrode current collector 6 is preferably set to be 1.1 mm or larger. In addition, for preventing the boss part 7a from cracking, the ratio of the outer diameter of the boss part 7a to the outer diameter of the collar part 6a is preferably set to be 3.1 or larger.

When the body diameter of the negative electrode current collector 6 is small, the fitting area between the inner peripheral face of the boss part 7a through which the negative electrode current collector 6 passes and the outer peripheral face of the negative electrode current collector 6 reduces to reduce the fixing force of the boss part 7a, thereby inviting leakage by creeping of the electrolyte along the interface between the negative electrode current collector 6 and the boss part 7a. Elongation of the boss part 7a suppresses reduction in the fitting area while reducing the inner volume of the battery, thereby inviting reduction in battery capacity. In view of this, the fitting area is preferably in the range between 28 mm$^2$ and 38 mm$^2$ for preventing leakage and reduction in battery capacity.

The present invention exhibits the same effects not only in the case where the boss part 7a of the gasket 7 is fitted around the negative electrode current collector 6 with it in contact with the collar part 6a of the negative electrode current collector 6 but also in the case where the boss part 7a is fitted around the negative electrode current collector 6 with it spaced apart from the collar part 6a of the negative electrode current collector 6. Specifically, the negative electrode current collector 6 having a body diameter of 1.8 mm or smaller reduces the frictional force between itself and the boss part 7a, which may cause the boss part 7a to move toward the negative electrode terminal plate 5 against the frictional force between the boss part 7a and the negative electrode current collector 6 upon pressure application to the boss part 7a by gas pressure rise inside the battery. The collar part 6a is, however, prevented from being buried in the softened boss part 7a even if the boss part 7a moves to be in contact with the collar part 6a, thereby securing the operation of the safety valve.

With no plating layer formed on the surface of the negative electrode current collector 6, the material cost reduces. With no plating layer, however, the surface roughness (Rmax) of the negative electrode current collector 6 becomes small to reduce the frictional force between the negative electrode current collector 6 and the boss part 7a. The present invention can exhibit remarkable effects in such a case. When the surface treatment of the negative electrode current collector 6 is taken into consideration, the surface roughness (Rmax) is preferably in the range between 0.3 μm and 3.0 μm.

When the content of copper of brass forming negative electrode current collector 6 is set small, the material cost reduces while on the other hand the electric conductivity of the negative electrode current collector 6 lowers. The lowered electric conductivity thereof increases heat generated in the negative electrode current collector 6 at short-circuit, so that the collar part 6a of the negative electrode 6 is liable to be buried in the softened boss part 7a. The present invention can exhibit remarkable effects in such a case. Preferably, the negative electrode current collector is made of brass of which a copper content is in a range between 50% and 60%.

Each specific structure of the elements of the alkaline battery shown in FIG. 1 will be described below.

The battery casing 1 is formed by press-forming, for example, a nickel-plated steel plate into predetermined shape and dimension. A conductive film may be formed on the inner face of the battery casing 1.

For the positive electrode 2, there is used a mixture of a positive electrode active material containing, for example, at least one of manganese dioxide powder and nickel oxi-hydroxide powder, a conductive agent, such as graphite powder or the like, and alkaline electrolyte. A binder, such as polyethylene powder or the like and a lubricant, such as stearate or the like may be added in addition.

The gelled negative electrode 3 is one obtained by, for example, gelling alkaline electrolyte by adding a gelling agent, such as sodium polyacrylate or the like and mixing with and dispersing into the thus gelled intermediate zinc allow powder as a negative electrode active material. In order to enhance the corrosion resistance, a metal compound having high hydrogen overvoltage, such as indium, bismuth, or the like, a phosphoric acid ester based surfactant, or the like may be added. Additionally, in order to suppress zinc dendrite, a slight amount of silicon compound, such as silicate, a salt thereof, or the like may be added.

For the separator 4, a non-woven fabric is used of which main constituents are polyvinyl alcohol fiber and rayon fiber, for example.

Each of the positive electrode 2, the gelled negative electrode 3, and the separator 4 contains alkaline electrolyte. The alkaline electrolyte is an aqueous solution containing potassium hydroxide of 30 to 40 wt % and zinc oxide of 1 to 3 wt %, for example.

The negative electrode terminal plate 5 is formed by press-forming, for example, a nickel-plated steel plate or a tin-plated steel plate into predetermined shape and dimension. In the peripheral part of the negative electrode terminal plate 5, a plurality of gas holes are formed for releasing pressure upon operation of the safety valve 8 of the basket 7.

The negative electrode current collector 6 is formed by press-forming a wire rod of silver, copper, brass, or the like into a nail shape having a predetermined dimension. In order to obtain effects of eliminating and concealing impurities in the processing, the surface of the negative electrode current collector 6 is preferably subjected to tin or indium plating.

The gasket 7 is formed by injection-molding, for example, 6,6-nylon or the like into predetermined shape and dimension.

EXAMPLE

The configuration and effects of the present invention will be described below further by referencing an example of the present invention. The present invention is not limited to the example.

Alkaline batteries as shown in FIG. 1 including negative electrode current collectors 6 of which body diameters are 1.80 mm, 1.45 mm, and 1.10 mm were prepared by the following manners.

(1) Formation of Positive Electrode Mixture

Electrolytic manganese dioxide powder having an average particle diameter of 35 μm and graphite powder having an average particle diameter of 15 μm were mixed with each other at a weight ratio of 94:6. The intermediate mixture and alkaline electrolyte (an aqueous solution containing potassium hydroxide of 35 wt % and zinc oxide of 2 wt %) were mixed with each other at a weight ratio of 100:2, were stirred sufficiently, and were then compressed into a flake shape. Then, the flake-shaped positive electrode mixture was crashed into granule, and the thus obtained granular intermediate was classified to have 10 to 100 meshes and was then press-formed into a hollowed cylindrical shape, thereby obtaining a pellet-shaped positive electrode mixture 2.

(2) Preparation of Negative Electrode

A gelling agent (sodium polyacrylate powder), alkaline electrolyte (an aqueous solution containing potassium hydroxide of 35 wt % and zinc oxide of 2 wt %), and zinc alloy powder were mixed with each other at a weight ratio of 0.8:33.6:65.6 to obtain the gelled negative electrode 3. The zinc alloy powder contained indium of 0.020 wt %, bismuth of 0.010 wt %, and aluminum of 0.004 wt %, and had an average particle diameter of 160 μm, wherein particles having a particle diameter of 75 μm were included by 35%.

(3) Accommodation of Power Generating Elements

Two pellets of positive electrode mixture 2 obtained in (1) were inserted into the battery casing 1, and pressure was applied to the positive electrode mixture 2 by a pressing jig to allow the positive electrode mixture 2 to adhere to the inner wall of the battery casing 1. The bottomed cylindrical separator 4 was placed into the hollowed central part of the positive electrode mixture 2 adhering to the inner wall of the battery casing 1. The separate 4 used was a non-woven fabric of which main constituents are polyvinyl alcohol fiber and rayon fiber. Then, alkaline electrolyte (a predetermined amount of an aqueous solution containing potassium hydroxide of 33 wt % and zinc oxide of 1 wt %) was injected into the separator 4. After a predetermined period of time elapsed, a predetermined amount of the gelled negative electrode 6 obtained in (2) was filled into the separator 4.

(4) Manufacture of Sealing Units.

Brass of 58% copper and 42% zinc was press-formed into nail shapes having a total length of 36 mm and body diameters of 1.80 mm, 1.45 mm, and 1.10 mm, and each end part of the thus pressed intermediates were upset to obtain negative electrode current collectors 6 including collar parts 6a having a thickness of 0.4 mm and diameters different from each other.

After the collar part 6a of the negative electrode current collector 6 was electrically welded to the negative electrode terminal plate 5, which was obtained by press-forming a nickel-plated steel plate of 0.4 mm in thickness into predetermined shape and dimension, the negative electrode current collector 6 was press-inserted into the through hole in the boss part 6a formed by injection-molding 6,6-nylon into predetermined shape and dimension, thereby obtaining the sealing unit 9. As the gasket 7, those were used which include the boss parts 7a having a length of 7.00 mm and outer diameters different from each other. The surface of the negative electrode current collector 6 was not covered with a plating layer and had a surface roughness (Rmax) of 2.50 μm.

The thus manufactured sealing units 9 were arranged on the opening end parts of the battery casings 1, each opening part of the battery casings 1 was bent inward to be sealed, and then, the outer label 10 was allowed to cover each outer surface of the battery casings 1, thereby obtaining D alkaline batteries.

The following short-circuit test was carried out on the alkaline batteries manufactured by the above manners to evaluate the operation of the safety valves.

(A) Short-Circuit Test

Two sets of battery groups were prepared in each of which four alkaline batteries manufactured by the above manners were fixed so that each terminal thereof faced in the same direction and so that the side faces thereof were in contact with each other. The four-battery sets were arranged adjacent to each other so that the terminals faces in the opposite direction, and a positive electrode terminal and a negative electrode terminal adjacent to each other were connected by resistance-welding with a nickel-plated lead having a width of 5 mm and a thickness of 0.5 mm to set the eight batteries connected in series. The eight series-connected batteries were left in a closed circuit state for 24 hours and were then set in an open circuit state for one week. Thereafter, the presence or absence of burst was checked.

(B) Test Results

FIG. 3 indicates results of the short-circuit test carried out on the alkaline battery sets in which the negative electrode current collectors 6 have body diameters of 1.80 mm, 1.45 mm, and 1.10 mm. Each dimension of the negative electrode current collectors 6 and the gaskets 7 (the boss parts 7a) is indicated in FIG. 4A and FIG. 4B, respectively.

Referring to the case where the body diameter (D) of the negative electrode current collector 6 was 1.80 mm, as indicated in FIG. 3, no burst was caused in the short-circuit test in the batteries of which a ratio ($2R_1/L_1$) of the outer diameter of the boss part to the outer diameter of the collar part was 4.0 or smaller (Examples 1 to 4) out of the batteries including the collar parts having different outer diameters ($L_1$) and the boss parts 7a having different outer diameters ($2R_1$) (Examples 1 to 4 and Comparative Example). In contrast, burst was checked in batteries having a ratio $2R_1/L_1$ of 5.3 (Comparative Example 1) in the short-circuit test.

Similarly, in the case where the body diameters (D) of the negative electrode current collectors 6 were 1.45 mm and 1.1 mm, no burst was caused in the short-circuit test in the batteries of which the ratio ($2R_1/L_1$) of the outer diameter of the boss part to the outer diameter of the collar part was 4.0 or smaller (Examples 5 to 8 and 9 to 12). In contrast, when batteries had a ratio $2R_1/L_1$ of 5.9 (Comparative Example 2) or when batteries had a ratio $2R_1/L_1$ of 5.6 (Comparative Example 3), burst was checked in the short-circuit test. Observation of the burst batteries revealed that the boss part 7a of the gasket 7 was buried in the collar part 6a of the negative electrode current collector 6 and the thin part 8 of the basket was not broken.

It is accordingly understood that when the body diameter of the negative electrode current collector 6 is set to be 1.80 mm or smaller, the ratio ($2R_1/L_1$) of the outer diameter of the boss part to the outer diameter of the collar part should be set to be 4.0 or smaller for allowing the safety valve to operate effectively by securely breaking the thin part 8 upon abnormal rise in the internal pressure of the battery.

Reduction in the body diameter of the negative electrode current collector 6 accompanies reduction in the fitting area (πD·H) between the inner peripheral face of the boss part 7a and the outer peripheral face of the negative electrode current collector 6. When the fitting area is approximately 24 mm² at the least (Examples 9 to 12), the collar part 7a is prevented from being buried in the boss part 7a to allow the safety valve to operate effectively.

Reduction in the fitting area between the inner peripheral face of the boss part 7a and the outer peripheral face of the negative electrode current collector 6 reduces the fastening force of the boss part 7a to invite leakage by creeping of the electrolyte along the interface between the negative electrode current collector 6 and the boss part 7a.

FIG. 5 is a table indicating results of examination of the presence or absence of leakage by creeping of the electrolyte in batteries having fitting areas (πD·H) made different from each other by changing the length (H) of the boss part 7a of the gasket 7 with the body diameter (D) of the negative electrode current collector 6 fixed at 1.6 mm. The outer diameter ($L_1$) of the collar part was 3.6 mm, the outer diameter ($2R_1$) of the boss part 7a was 14.2 mm, and the fitting rate ($D/R_2$) was 1.05. No plating layer was formed on the surface of the negative electrode current collector 6, and the surface roughness (Rmax) of the negative electrode current collector 6 was 2.5 μm.

As indicated in FIG. 5, when the fitting area was 26.6 mm², leakage by creeping was caused between the negative electrode current collector 6 and the gasket 7. When the fitting area was 38.2 mm², which means elongation of the boss part 7a, the inner volume of the battery reduces to degrade the discharge performance of the battery. In view of this, the fitting area is preferably in the range between 28 mm² and 38 mm² for preventing leakage by creeping and reduction in battery capacity.

The preferred embodiment of the present invention has been described heretofore, which will not serve as any limitation, and various modifications are possible, of course. For example, the above embodiment refers to D and C alkaline batteries, but the present invention is not limited thereto and may be applicable to AA and AAA alkaline batteries, of course.

What is claimed is:

1. An alkaline battery, comprising a battery casing and a sealing unit sealing an opening part of the battery casing, wherein
the sealing unit includes a negative electrode terminal plate, a negative electrode current collector joined to the negative electrode terminal plate, and a gasket,
the gasket includes a boss part through which the negative electrode current collector passes, an outer peripheral part in contact with the opening part of the battery casing, and an annular part arranged between the boss part and the outer peripheral part, a part of the annular part being formed into a thin part serving as a safety valve,
the negative electrode current collector has a body diameter of 1.8 mm or smaller and includes at an end part thereof a collar part, and
a ratio of an outer diameter of the boss part to an outer diameter of the collar part is 3.1 or larger and 4.0 or smaller.

2. The alkaline battery of claim 1, wherein
the gasket is fitted around the negative electrode current collector with the boss part being in contact with the collar part of the negative electrode current collector.

3. The alkaline battery of claim 1, wherein
the collar part is formed by upsetting the end part of the negative electrode current collector.

4. The alkaline battery of claim 1, wherein
the body diameter of the negative electrode current collector is 1.1 mm or larger.

5. The alkaline battery of claim 1, wherein
a fitting area between an inner peripheral part of the boss part and an outer peripheral face of the negative electrode current collector is in a range between 28 mm² and 38 mm².

6. The alkaline battery of claim 1, wherein
no plating layer is formed on a surface of the negative electrode current collector.

7. The alkaline battery of claim 6, wherein
the negative electrode current collector has a surface roughness (Rmax) in a range between 0.3 μm and 3.0 μm.

8. The alkaline battery of claim 1, wherein
the negative electrode current collector is made of brass of which a copper content is in a range between 50% and 60%.

9. The alkaline battery of claim 1, wherein
the alkaline battery is a C battery or a D battery.

10. A sealing unit of an alkaline battery for sealing an opening part of a battery casing, comprising: a negative electrode terminal plate; a negative electrode current collector joined to the negative electrode terminal plate; and a gasket, wherein the gasket includes a boss part through which the negative electrode current collector passes, an outer peripheral part in contact with the opening part of the battery casing, and an annular part arranged between the boss part and the outer peripheral part, a part of the annular part being formed into a thin part serving as a safety valve, the negative electrode current collector has a body diameter of 1.8 mm or smaller and includes at an end part thereof a collar part, and a ratio of an outer diameter of the boss part to an outer diameter of the collar part is 3.1 or larger and 4.0 or smaller.

11. The sealing unit of claim 10, wherein the gasket is fitted around the negative electrode current collector with the boss part being in contact with the collar part of the negative electrode current collector.

\* \* \* \* \*